United States Patent [19]

Thomson et al.

[11] Patent Number: 5,512,753
[45] Date of Patent: Apr. 30, 1996

[54] SCINTILLATION COUNTING SYSTEM USING SCINTILLATOR CAPSULES

[75] Inventors: James Thomson, Bedum; Jan ter Wiel, Loppersum; Harry van Lune, Groningen; Herbert M. Bösel, Haren, all of Netherlands; Gerhard H. Kremer, Richterswil, Switzerland

[73] Assignee: Packard Instrument, B.V., Ulgermaweg, Netherlands

[21] Appl. No.: 255,472

[22] Filed: Jun. 8, 1994

[51] Int. Cl.⁶ ............................................. G01T 1/204
[52] U.S. Cl. .................. 250/361 R; 250/362; 250/483.1; 250/484.2
[58] Field of Search ............................... 250/328, 361 R, 250/362, 364, 483.1, 484.2, 486.1

[56] References Cited

U.S. PATENT DOCUMENTS

| | | |
|---|---|---|
| 2,745,967 | 3/1949 | Ludeman . |
| 2,750,514 | 6/1956 | Armistead .................. 250/361 R X |

(List continued on next page.)

FOREIGN PATENT DOCUMENTS

| | | |
|---|---|---|
| 0026914 | 10/1980 | European Pat. Off. . |
| 0070686 | 7/1982 | European Pat. Off. . |
| 0114941 | 8/1984 | European Pat. Off. . |
| 0185494 | 6/1985 | European Pat. Off. . |
| 0174744 | 8/1985 | European Pat. Off. . |
| 0203048 | 5/1986 | European Pat. Off. . |
| 0212450 | 8/1986 | European Pat. Off. . |
| 0378059 | 7/1990 | European Pat. Off. . |
| 0457154 | 5/1991 | European Pat. Off. . |
| 1590762 | 5/1970 | France . |
| 2359422 | 2/1978 | France . |
| 1241001 | 5/1963 | Germany . |
| 1955335 | 11/1969 | Germany . |
| 232072A1 | 7/1984 | Germany . |
| 56-25470 | 7/1979 | Japan . |
| 56-132583A | 10/1981 | Japan . |
| 57-146178A | 9/1982 | Japan . |
| 57-184990 | 11/1982 | Japan . |
| 62-290789A | 12/1987 | Japan . |
| 63-101787 | 5/1988 | Japan . |
| 6-1971 | 1/1994 | Japan . |
| 1422526 | 1/1976 | United Kingdom . |
| 2007362 | 5/1979 | United Kingdom . |
| 2095830 | 10/1982 | United Kingdom . |
| WO8902088 | 3/1989 | WIPO . |
| WO8902089 | 3/1989 | WIPO . |
| 8912838 | 12/1989 | WIPO ................................. 250/328 |
| WO90/11524 | 3/1990 | WIPO . |
| WO9003844 | 4/1990 | WIPO . |
| 9006526 | 6/1990 | WIPO ................................. 250/362 |
| WO9011524 | 10/1990 | WIPO . |

OTHER PUBLICATIONS

Hart et al, Scintillation–Proximity Assay of Particulate Binding Properties, Biophysical Journal vol. 21, 1978, p. 93a.

Hart et al, Scintillation Proximity Assay (SPA) of Antigen–Antibody Binding Kinetics, Basic Nuclear Science, Proceedings of 25th Annual Meeting, vol. 19, No. 6, p. 681.

(List continued on next page.)

Primary Examiner—Constantine Hannaher
Assistant Examiner—Edward J. Glick
Attorney, Agent, or Firm—Arnold, White & Durkee

[57] ABSTRACT

A scintillation counting system utilizing scintillator capsules for the detection of radioactive substances in a sample for analysis include a liquid scintillator core encapsulated within a shell. The liquid scintillator comprises a base component or components and one or more fluors. The base component preferably includes one or more aromatic solvents. The fluors useful in the liquid or gel scintillator include any of the organic fluors well-known in the scintillation counting art. The liquid or gel scintillator can also include a wavelength shifter (i.e. secondary fluors). Useful wavelength shifters are also well known in the scintillation counting art. Additionally, a other materials can be added to the scintillator capsules to modify the characteristics of the scintillator capsules, and the scintillator capsules can be used in a variety of scintillation counting applications.

37 Claims, 2 Drawing Sheets

U.S. PATENT DOCUMENTS

| | | | |
|---|---|---|---|
| 2,985,593 | 5/1959 | Broderick et al. | |
| 3,010,908 | 11/1961 | Broderick et al. | |
| 3,068,178 | 12/1962 | Kallmann et al. | |
| 3,134,018 | 11/1964 | Schranz. | |
| 3,356,616 | 12/1965 | Sandler et al. | 252/301.2 |
| 3,418,127 | 12/1968 | Millikan et al. | 96/82 |
| 3,418,152 | 12/1968 | Staudenmayer et al. | 117/63 |
| 3,457,180 | 7/1969 | Kretz et al. | |
| 3,491,235 | 1/1970 | Millikan. | |
| 3,513,102 | 5/1970 | Heidke. | |
| 3,536,914 | 11/1970 | Chapman. | |
| 3,542,588 | 11/1970 | Heidbrink et al. | 117/124 |
| 3,594,217 | 5/1971 | Seybert et al. | 117/119.6 |
| 3,646,346 | 2/1972 | Catt. | |
| 3,649,464 | 3/1972 | Freeman | 195/140 |
| 3,676,360 | 6/1972 | Shamoo | 252/301.2 R |
| 3,758,412 | 9/1973 | Grum et al. | 252/301 R |
| 3,814,967 | 6/1974 | Takata et al. | |
| 3,853,584 | 12/1974 | Tatsuta et al. | 117/34 |
| 3,857,036 | 12/1974 | Novak | 250/367 |
| 3,886,082 | 5/1975 | Hyman, Jr. | |
| 3,898,457 | 8/1975 | Packard et al. | 250/328 |
| 3,924,128 | 12/1975 | Frank | 250/328 |
| 3,925,659 | 12/1975 | Paap et al. | |
| 3,928,227 | 12/1975 | Sena et al. | 252/301.2 |
| 3,939,094 | 10/1976 | Kauffman | 252/301.2 |
| 3,992,158 | 11/1976 | Przybylowicz et al. | |
| 4,000,252 | 12/1976 | Kosak. | |
| 4,108,972 | 8/1978 | Dreyer. | |
| 4,127,499 | 11/1978 | Chen et al. | |
| 4,138,336 | 12/1978 | Mendel et al. | 210/198 |
| 4,154,795 | 6/1979 | Thorne | 422/99 |
| 4,157,983 | 6/1979 | Golden. | |
| 4,161,515 | 7/1979 | Ullman. | |
| 4,180,479 | 12/1979 | Siegrist et al. | |
| 4,256,834 | 3/1981 | Zuk et al. | |
| 4,258,001 | 3/1981 | Pierce et al. | |
| 4,259,313 | 3/1981 | Frank et al. | |
| 4,271,139 | 6/1981 | Hart. | |
| 4,275,300 | 6/1981 | Abbott | 250/304 |
| 4,275,333 | 6/1981 | Kagami et al. | |
| 4,276,259 | 8/1981 | Eibl et al. | 422/71 |
| 4,292,272 | 9/1981 | Kitajima et al. | 422/57 |
| 4,298,796 | 11/1981 | Warner et al. | 250/328 |
| 4,358,401 | 11/1982 | O'Brien et al. | 252/628 |
| 4,372,941 | 2/1983 | Ryan | 424/1 |
| 4,375,423 | 3/1983 | Cusano et al. | 252/301.36 |
| 4,382,074 | 5/1983 | Hart. | |
| 4,388,296 | 6/1983 | Hart. | |
| 4,396,528 | 8/1983 | Abbott | 252/301.17 |
| 4,406,816 | 9/1983 | Sliwka. | |
| 4,420,444 | 12/1983 | Yamada et al. | |
| 4,444,677 | 4/1984 | Edelstein et al. | |
| 4,451,434 | 5/1984 | Hart. | |
| 4,493,815 | 1/1985 | Fernwood et al. | 422/101 |
| 4,495,084 | 1/1985 | Shimizu et al. | 252/301.17 |
| 4,520,110 | 5/1985 | Stryer et al. | 436/501 |
| 4,562,158 | 12/1985 | Schellenberg. | |
| 4,588,698 | 5/1986 | Gruner et al. | |
| 4,604,364 | 8/1986 | Kosak. | |
| 4,624,799 | 9/1986 | Hegge et al. | 252/301.17 |
| 4,626,513 | 12/1986 | Burton et al. | |
| 4,657,696 | 4/1987 | Thomson | 252/301.17 |
| 4,692,266 | 9/1987 | Costa et al. | |
| 4,713,198 | 12/1987 | Simonetti. | |
| 4,728,792 | 3/1988 | Warner et al. | 250/328 |
| 4,754,138 | 6/1988 | Edelstein et al. | 250/328 |
| 4,828,386 | 6/1988 | Matkovich et al. | 356/246 |
| 4,832,917 | 5/1989 | Elliott | 250/364 X |
| 4,867,905 | 9/1989 | Wunderly. | |
| 4,916,320 | 4/1990 | Wunderly et al. | 250/483.1 |
| 4,933,554 | 6/1990 | Lehtinen et al. | 250/328 |
| 4,972,084 | 11/1990 | Potter et al. | |
| 5,030,453 | 7/1991 | Lenk et al. | |
| 5,043,581 | 5/1991 | Joss | 250/328 |
| 5,155,364 | 10/1992 | Fujii. | |
| 5,198,364 | 3/1993 | Oikari et al. | |
| 5,243,193 | 9/1993 | Suontausta et al. | |
| 5,292,835 | 3/1994 | Jahns et al. | |

OTHER PUBLICATIONS

Campbell et al, Assay of Tritium–filled Glass Microspheres by Liquid Scintillation Counting, Jun. 1979, p. 232–234.

Udenfriend et al, Scintillation proximity radioimmunoassay utilizing 125 I–labeled ligands, Aug. 6, 1985, Proc. Nat'l. Acad. Sci. USA, vol. 82, pp.8672–8676, Dec. 1985, pp. 8672–8676.

Gupta, Organic Scintillators and Liquid Scintillation Counting, Proceedings of the International Conference on Organic Scintillators and Liquid Scintillation Counting, University of California, San Francisco, Jul. 7–10, 1970, pp. 747–752.

Prydz et al., Fast Radiochromatographic Detection of Tritium with "Liquid" Scintillators at Lower Temperatures, Feb. 1970, Analytical Chemistry, vol. 42, No. 2, p. 156.

Gopi Nath Gupta, New Procedure of Micro–Solid Scintillation Counting on Flour–Coated Glass–Fiber Support in Plastic Minibags for $H^3$, $C^{14}$, $S^{32}$ and $P^{34}$ Samples, The Population Council, the Rockefeller University, New York, NY, pp. 753–756.

Transcation of Japan Patent Application No. 62–8192, Apr. Scintillation counting composition and elements, Research Disclosure #16061, Aug. 1977, pp. 42–46.

Bollinger, et al., A Simple Gelation Procedure for Liquid Scintillation Counting, Analycial Chemistry, vol. 39, No. 12, pp. 1508–1509, Oct., 1967.

O'Conner, et al., Difficulties in Counting Emulsion of $^3H$ and $^{14}C$ Labelled Biomolecules, Liquid Scintillation Counting Recent Applications and Development, vol. II., pp. 245–258 (1980).

Bonner, et al., Efficient Fluorography of $^3H$ and $^{14}C$ on Thin Layers, Analytical Biochemistry 89, pp. 247–256 (1978).

Influence of Polystyene Excimers on the Excitation Energy Transfer in Solid Scintillating Solutions, Journal of Polymer Science: Polymer Physics Edition, vol. 22, pp. 2275–2278 (1984).

Benakis, A New Gelifying Agent in Liquid Scintillation Counting, pp. 735–745 (no date).

Gupta, New Method of Micro–Liquid Scintillation Counting in Plastic Minibags for $H^3$, $C^{14}$, $S^{35}$ and $P^{32}$ Samples, pp. 747–752 (no date).

Lupica, Polyethoxylated Nonionic Surfactants in Toluene for Liquid Scintillation Counting of Tritium in Aqueous Samples, International Journal of Applied Radiation and Isotopes, 1970, vol. 21, pp. 487–490.

Chase, et al., Principles of Radioisotope Methodology, Third Edition, pp. 301–302 (no date).

Potter, et al., Scintillation Counting of Harvested Biological Samples with Low–Energy Beta Emitters, Using Solid–Scintillant–Filters, pp. 1–20 (no date).

Christophorou, Improved Organic Scintillators in 2–Ethyl Naphthalene, Nature, vol. 212, pp. 816–818, Nov. 1966.

Meyer, et al., A New Liquid Scintillator, Nuclear Instruments and Methods, vol. 22, Nov., 1962, pp. 371–372.

Yamakoshi, Kerosine Scintillator, Nuclear Instruments and Methods, vol. 126, pp. 407–412, Oct., 1974.

SCINTILLATION COUNTING SYSTEM USING SCINTILLATOR CAPSULES

FIELD OF THE INVENTION

The invention relates to a scintillation counting system capable of detecting weak beta radiation in radioactively labelled sample materials by using liquid scintillator capsules.

BACKGROUND OF THE INVENTION

Liquid scintillation counting and automated instruments known as liquid scintillation counters are widely utilized to analyze samples containing radioactively labelled substances.

Typically, a sample in solution is mixed with a liquid scintillator, commonly referred to as a cocktail, and the light events produced from the sample and cocktail mixture are detected according to their energy and number of events. The light events occur when the energy of the particles, emitted from the radioactive isotope component of the sample in solution, is transferred to the molecules of the liquid scintillator. This produces a light emission of a specific energy range which is characteristic of the radioactive isotope.

Detecting both the energy and number of light events in a particular energy range provides the information necessary to construct a spectrum. Using this information the radioactive species can be quantitatively analyzed. Liquid scintillation counting and automated instruments to perform liquid scintillation counting have been widely discussed in a multitude of publications and patents.

Scintillation counting of liquid samples has certain disadvantages attributable to the nature of the liquid species used. One is a phenomenon known as quench. Quench commonly refers to a chemical or optical effect on the scintillation process which results in loss of light events or reduction in light emission energy. The chemical nature of the solution in which the sample and scintillator are mixed and the color of the liquid sample solution are the causative agents. The result is inefficiency in the ability of the liquid scintillation counter to accurately count the scintillations resulting from particle disintegrations of the isotopes, and therefore interference with sample analysis.

Another disadvantage in scintillation counting of liquid samples is that, after analysis, the liquid produced by mixing the radioactive sample with the cocktail must be disposed of. The regulations governing the disposal of liquid radioactive materials are particularly rigorous. Due to the volume of liquid radioactive materials that require disposal, the costs can be considerable. In many cases a solid material having a radioactive nature is easier to dispose of and incurs far less expense.

The technique or solid scintillation counting (SSC) differs from liquid scintillation counting (LSC) in a very fundamental way. In SSC the sample is presented as a liquid and then by evaporation/drying is converted to a solid residue which ends up in intimate contact with the solid scintillator. In LSC the sample is presented as a liquid and counted (analyzed) in the same liquid form. Thus SSC can be seen to have advantages over LSC in that significantly smaller volumes of waste are generated. The present solid scintillators are inorganic phosphors (e.g. yttrium silicate doped with cerium, zinc sulphide doped with silver, yttrium oxide doped with europium, etc.) and as such are not combustible.

At present there are four types of scintillation compositions. These are:

1. solid scintillators comprising a crystal of a solid hydrocarbon material;
2. liquid scintillators which comprise one or more suitable solid scintillators dissolved in a liquid solvent;
3. so-called solid solution scintillators which comprise a solid scintillator in a solid polymeric solution; and
4. solid scintillators comprising a crystal of a suitable inorganic material.

The present invention is not readily categorized by the above groups but rather seems to require a new grouping of "dry" liquid scintillators.

The following patents further illustrate the uses of solid scintillators and the technique of solid scintillation counting.

European Patent EP 0 212 450 A1, March 1987, describes a dry solid scintillator counting composition for the detection of radioactive substances in a liquid comprising a mixture of fluor particles and a binder bonding the particles into a coherent structure.

U.S. Pat. No. 4,562,158, Dec. 31, 1985 describes a solid phase scintillation counting method wherein a scintillating material is added to an inert carrier and a radioactive substance is caused to contact the carrier either before or after the scintillating material has been applied.

International Patent application WO 89/02088 & 9 describes the use of an inorganic solid scintillator which is attached to a solid support medium by a binder material.

U.S. Pat. No. 4,127,499, Nov. 28, 1978 describes scintillation counting compositions comprising polymeric particles derived from a latex and loaded with at least one uniformly dispersed hydrophobic fluor so as to permit detection of low-energy radiation.

U.S. Pat. No. 3,491,235, Jan. 20, 1970 describes a method for producing fluorescent layers by dispersing an organic solution of fluorescent compounds in aqueous colloid solution, coating and drying.

Japanese Patent Publication Sho 63-101787, May 6, 1988 describes multi-layer scintillators made by piling up either mixed monomolecular films consisting of radiation absorbing compounds and compounds emitting ultraviolet, visible or infrared radiation, or monomolecular films consisting of radiation absorbing compounds and separate monomolecular films consisting of compounds emitting ultraviolet, visible or infrared radiation. The layers are deposited from a solution of the compounds in chloroform.

U.S. Pat. No. 4,588,698, May 13, 1986 describes the microencapsulation of solid phase scintillators in gels which are selectively permeable to a diffusible radioactive label.

All of the aforementioned types of solid scintillators have limitations on their use which although not totally inhibitory nevertheless impose limitations on the scope of their use. The solid scintillators comprising a crystal of a solid hydrocarbon material are limited in use when the radioactively labelled substance is presented in an organic solvent medium. The so-called solid solution scintillators are limited by their inability to achieve intimate contact between the emitter and the fluor. Such intimate contact is particularly important when weak, short range radiations are to be detected by the fluor, for example, sample systems of weak beta-emitters such as tritium and Carbon-14 or gamma-emitters such as iodine-125. Liquid scintillation counting compositions are capable of detection efficiencies above 35% and in some cases theoretically 100%, most probably due to the intimate radioactive emitter-fluor contact possible in a liquid medium.

As will be seen from the following description, the present invention represents a significant improvement over the prior art methods for counting scintillations resulting from radioactive emissions in a sample for analysis.

SUMMARY OF THE INVENTION

It is an object of the present invention to provide a system of scintillation counting which provides the ability to detect radioactively labelled substances in either an organic or aqueous solvent medium.

It is another object of the present invention to provide a system of scintillation counting which can avoid accumulating large volumes of radioactive waste.

It is still another object of the present invention to provide a system of scintillation counting providing the potential for waste disposal as either solid waste or as combustible solid waste.

It is a further object of the present invention to provide a system of scintillation counting which can be utilized for the counting of scintillations from wet or dry samples.

It is a still further object of the present invention to provide a system of scintillation counting which can be adapted for use in a variety of scintillation counting applications.

The scintillation counting system of the present invention accomplishes these and other objects by using liquid scintillator capsules or particles to perform scintillation counting. A scintillator capsule includes a wall surrounding a liquid scintillator core having a fluorescent substance or substances that emit light energy in response to radioactive substances in a sample for analysis. In particular, the present invention involves the scintillator capsules and a method for detecting radioactivity in a sample for analysis using the scintillator capsules.

In accordance with the principles of a preferred embodiment of the present invention, the scintillator capsules for the detection of radioactive substances in a sample for analysis include a liquid or gel scintillator core encapsulated within a shell. Preferably, the liquid or gel scintillator core comprises a base component or components and one or more fluors. The base component preferably includes one or more aromatic solvents. The fluors useful in the liquid or gel scintillator include any of the organic fluors well-known in the scintillation counting art or any other suitable fluor. The liquid scintillator can also include a wavelength shifter (i.e. secondary fluors). Useful wavelength shifters are also well known in the scintillation counting art. Additionally, the scintillator capsules can be used in a variety of scintillation counting applications by changing the materials used for the scintillator capsules, adding additional materials to the scintillation capsules, modifying the encapsulation process or varying the characteristics of scintillator medium containing the scintillator capsules if a scintillator medium is present.

BRIEF DESCRIPTION OF THE DRAWINGS

Other aspects and advantages of the present invention may become apparent upon reading the following detailed description and upon reference to the drawings in which.

While the invention is susceptible to various modifications and alternative forms, specific embodiments thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 1A:
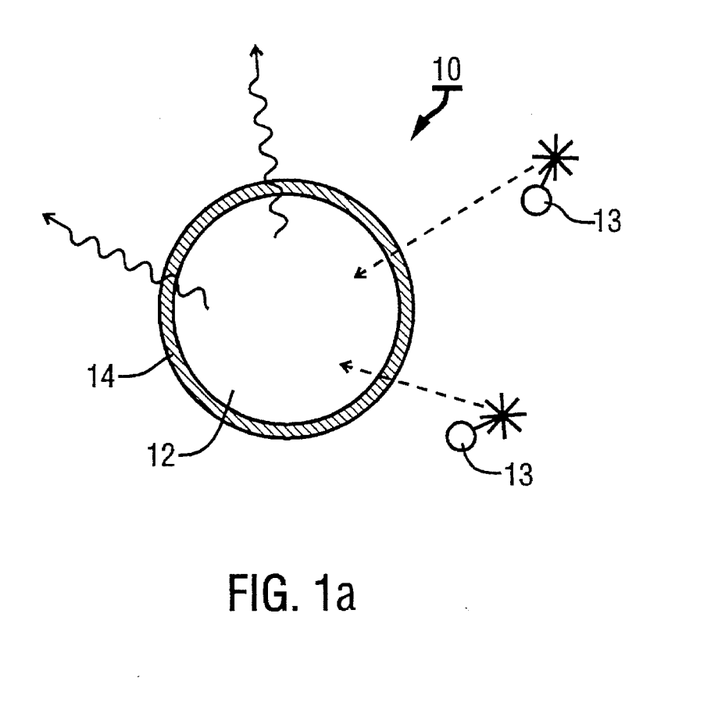
FIGS. 1a–1d show alternative forms of the liquid scintillator capsules in accordance with the principles of the present invention.

As indicated above, the present invention relates to a scintillation counting system of scintillator capsules or "solid" liquid scintillator particles and a method for performing scintillation counting with the scintillator capsules or particles. Incidentally, the term liquid includes viscous gels or any other fluid. In accordance with a preferred embodiment of the present invention, FIG. 1a shows a scintillator capsule or particle 10 for detecting radioactive substances 13 in a sample by utilizing a scintillation counter. The scintillator capsule 10 includes a liquid scintillator 12 having a fluorescent substance or substances for converting radiation energy into light energy, and the liquid scintillator core 12 is encapsulated within a wall or shell 14. More specifically, the liquid scintillator 12 can have one or more fluors and a base component or base components of one or more aromatic solvents. Preferably, the fluor or fluors are dissolved in the aromatic solvent or solvents. Examples of aromatic solvents useful in the present invention include, solely by way of example, toluene, xylene, pseudocumene, dodecyl benzene, diisopropyl naphthalene, phenyl xylylethane and the like. The fluors useful in the liquid scintillator include any of the organic fluors well-known in the scintillation counting art. Generally, suitable fluorescent compounds can be selected, for example, from those described as "organic fluors" and "organic scintillators" in *Organic Scintillation Detection*, E. Schram and R. Lombaert, Elsevier Publishing Co., 1963. Useful wavelength shifters (i.e. secondary fluors) can be also be included in the scintillator core 12 and are well known in the scintillation counting art.

Preferred among these classes of materials are 2,5-diphenyloxazole (PPO) as the primary fluor and either bis(o-methylstyryl) benzene (bis-MSB) or 9,10-diphenylanthracene or 9,10-dimethylanthracene as the secondary fluor. The primary fluor is preferably present in the range 0.01 to 5.0 wt %. The secondary fluor is preferably present in the range 0.001 to 0.5 wt %. Additionally, energy transfer compounds which enhance the scintillation properties are optional and include compounds like naphthalene, anthracene, durene and di-alkylnaphthalenes. They are added in the range 0.01 to 15 wt %.

Figure 1B:
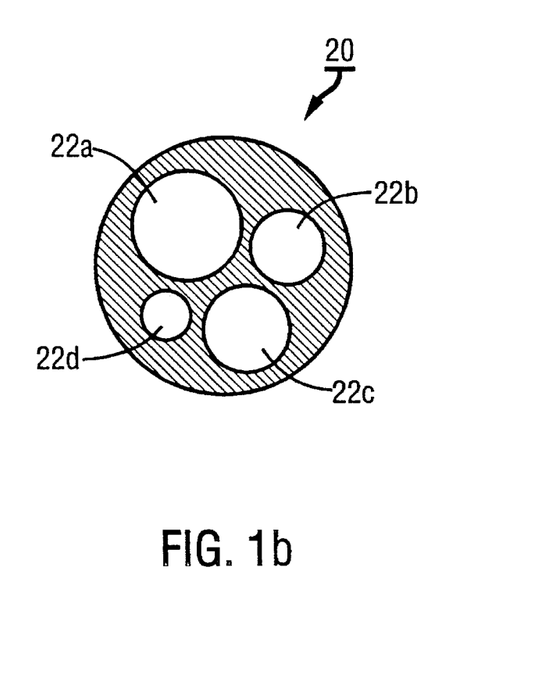
Figure 1C:
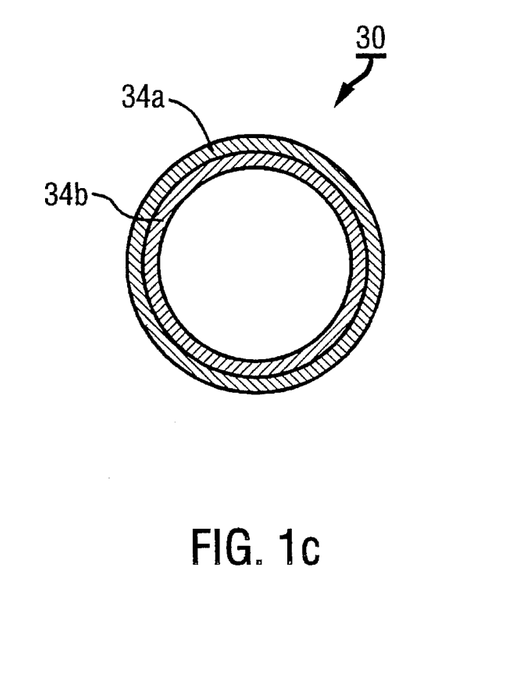

Additional components, such as other materials or particles, can be added to the liquid or gel scintillator 12 to modify or adjust the characteristics of the scintillator capsule 10. For example, additional components can be added to the liquid or gel scintillator 12 for modifying or adjusting the specific gravity or density of the scintillator capsule 10. Moreover, magnetic particles can be added to the capsule 10 to add a magnetic characteristic to the scintillator capsule, and electrically-conductive or electrically-charged particles can be included in the scintillator capsule 10 to modify the electrical characteristics of the scintillator capsule 10. Other materials or substances can also be included in the liquid scintillator 12 to increase the viscosity of the scintillator core 12, thereby facilitating the suspension of any characteristic-modifying particles in the scintillator core or cores. Alternatively as shown in FIG. 1b, scintillator capsule 20 can include multiple cores 22a–d, and the multiple cores must include at least one scintillator core but can also include a core or cores having different liquid scintillators or different characteristic-altering materials or substances. Moreover, as shown in FIG. 1c, the scintillator capsule 30 can also include a configuration with multiple walls 34a–b.

The liquid scintillator capsules can be obtained as a dispersion in a liquid or in a dry form. As such, the liquid scintillator capsules of the present invention can be utilized in a variety of different applications. For example, the liquid scintillator particles can be used in wet or dry counting. The dry counting can result by placing "dry" liquid scintillator capsules and a dry sample together or placing the dispersion of scintillator capsules and a dry or wet sample together followed by evaporation or removal of the liquid medium. With regard to waste disposal, the encapsulated liquid scintillators have an advantage over current solid scintillator materials in that the encapsulated liquid scintillators can be treated as solid waste. The encapsulated liquid scintillators can further have a combustible central core encased in a combustible shell. Thus, the encapsulated liquid scintillators can optionally be considered as solid waste or combustible solid waste and thereby allowing greater disposal flexibility.

Wet counting can be performed by placing the dispersion of scintillator capsules or particles and a wet or dry sample together without evaporating or removing the liquid medium. After counting and depending on the particular application, the liquid medium can still be dried, evaporated or removed to permit disposal as solid waste. Because the encapsulated liquid scintillators are useful in a variety of different application, disposal as a solid may not be practical in all applications.

The encapsulated liquid scintillators can be utilized in a variety of applications, including and in no way limited to tritiated thymidine incorporation, solid flow cells, electrophoresis gels, cytotoxicity assays, intensifying screens for autoradiography, etc.

In applications involving tritiated thymidine incorporation, proliferating cells incorporate $^3$H Thymidine into their nuclear DNA. To assess the total number of proliferating cells the cells are harvested onto glass fibre filters with the DNA becoming physically bound to the filter. The bound radio-labelled DNA is then normally detected by the addition of LSC cocktail to the filter, and then analyzed by conventional LSC. An aqueous suspension of liquid scintillator capsules can be used as a wash solution during the harvesting step. This results in capsules being trapped within the glass fibre filter with the consequence that the bound radio-labelled DNA is surrounded by scintillator capsules. After drying the filter is analyzed by a suitable scintillation counting method. As such, the encapsulated liquid scintillators can prevent the accumulation of undesirable mixed solid/liquid waste and results in material which can be considered as solid waste.

The encapsulated liquid scintillators of the present invention are also advantageous in solid flow cells which are used in flow-through radioactivity HPLC detectors. As is known by those skilled in the art about this technique, the effluent from a HPLC passes through a coiled tube containing solid inorganic scintillators and the resulting light emission is detected and quantified by one or by two photomultiplier tubes. Currently used solid inorganic scintillators are expensive and prone to memory effects with certain sample types (adsorption and retention of sample on the inorganic scintillator). Replacement of the solid inorganic scintillator with the encapsulated liquid scintillator will reduce the memory effect substantially due to the substantially different surface characteristics of the two materials.

In electrophoresis cells, the gels are made by the polymerization of monomers in the presence of suitable cross-linking agents. The technique of Gel Electrophoresis is mainly used to separate protein mixtures and RNA preparations, as well as in binding studies with nucleic acids and polypeptides. After electrophoresis, the gels are subjected to extensive and very time consuming sample preparation steps before the radio-labelled species can be detected. Utilizing the encapsulated liquid scintillators or the scintillator capsules of the present invention, the liquid scintillator capsules or particles can be incorporated into the gel itself, thereby simplifying sample preparation and allowing the separated radio-labelled species to be detected by optical imaging techniques. In fact, the core or cores of the scintillator capsules can include electrically-charged or electrically-conductive particles to enhance the detection of the radio-labelled species.

In the cytotoxicity assay (Chromium Release), the target cells are labelled with $^{51}$Cr. The cytotoxic effect of compounds or effector cells leads to target cell morbidity with subsequent release of the $^{51}$Cr into the supernatant or culture medium. To determine the degree of cytotoxic effect fixed aliquots of the supernatant are analyzed by gamma, liquid scintillation counting, or solid scintillation counting. In the latter method, the encapsulated liquid scintillator can replace the solid inorganic scintillators normally used with the same benefits as mentioned relative to waste disposal.

In conventional autoradiography, a radiographic film such as a high sensitivity radiographic film is combined in layers with a filter or gel retaining a captured radioactively labelled species for a give time so that the film is exposed to the radiation. A radiographic intensifying screen is generally employed to enhance the detection sensitivity of autoradiography. The intensifying screen works by converting the emitted radiation into emitted light and therefore substantially reducing exposure or development time. Such intensifying screens usually consist of inorganic solid scintillators (phosphors) bonded onto a support layer and then covered by a protective film. The encapsulated liquid scintillator can be used in place of the inorganic solid scintillators with the attendant waste disposal advantages previously mentioned.

Thus, the above examples illustrate the flexibility of the encapsulated liquid scintillators. The encapsulated liquid scintillators can advantageously replace standard solid scintillators in many applications and yet retain the advantages and energy characteristics of liquid scintillators. Additionally, the wet or dry counting applications can be expanded or modified by adding materials to the scintillation capsules or the dispersion of scintillator capsules. For instance, a binder can be added to the dispersion of scintillator capsules and placed in a sample container, sheet or cover. After evaporation of the liquid medium, the scintillator capsules are attached to or coat the surface of the sample container, sheet or cover. As such, the sample container is prepared to receive a sample for analysis, and the sample sheet or cover can be placed over a sample for analysis.

Furthermore, modifications to or changes in the encapsulation process can also alter the characteristics or materials of the scintillator capsules, thereby further expanding the potential applications for the scintillator capsules. Some of these characteristics include the core material, the shell material, capsule size and shell thickness.

The liquid or gel scintillator or scintillators including any additional components are encapsulated to form the scintillator capsules. Depending on the encapsulation method, the scintillator capsules size can range from 0.1–10000 μm but sizes ranging from below 1 micron to about 2000 microns are typical. The scintillator particles consist of an inside core or cores. According to the preferred encapsulation method, the scintillator core preferably contains a lipophilic or hydrophobic substance or a substance which is only sparingly soluble in water. The scintillator capsule core or cores, however, can include water soluble or water insoluble material by selecting the appropriate encapsulation method. In a preferred embodiment of the present invention, a very large percentage (up to greater than 99%) of the scintillator core comprises aromatic solvent or solvents to provide a high detection efficiency system. Moreover, the preferred surrounding wall or shell is plastic, but the wall material also can be changed by selecting the appropriate encapsulation method.

Figure 1D:
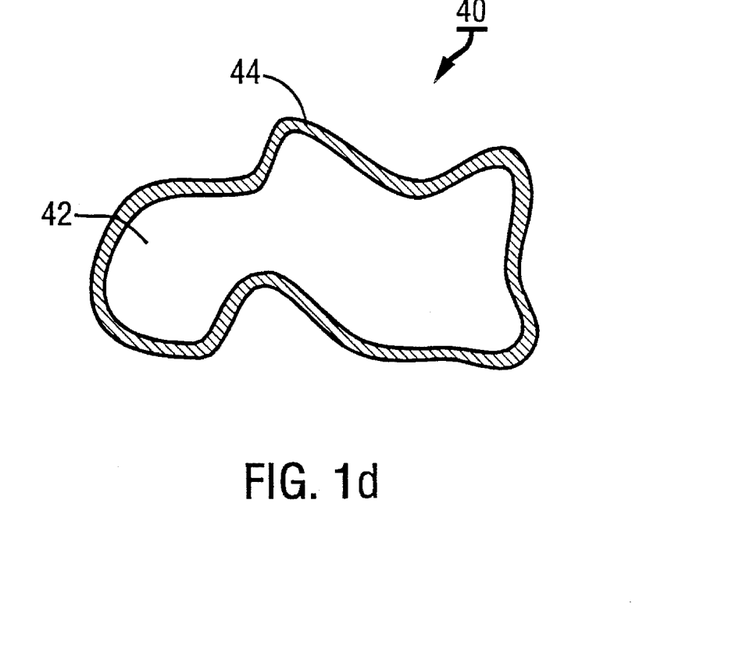
Figure 2:
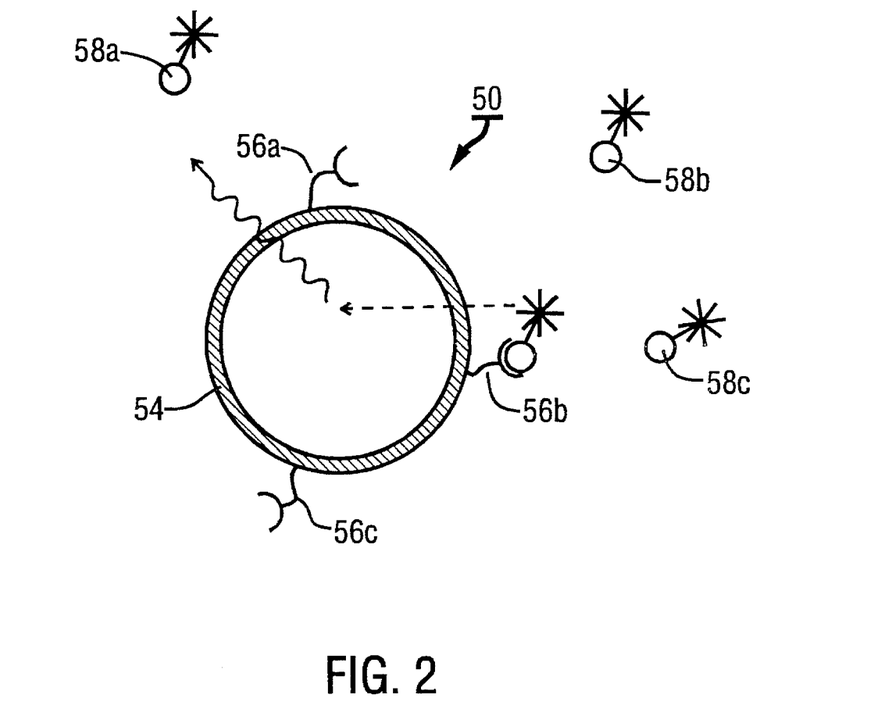
FIG. 2 shows a scintillator capsule with receptors attached to the wall of the scintillator capsule to perform a proximity assay implemented in accordance with the principles of the present invention.

Additionally, other characteristics of the scintillator capsules can be varied depending on the desired application and the selected encapsulation process. For instance, the scintillator capsules can have a core surrounded by a shell, multiple cores or multiple walls. Moreover, when lipophilic or hydrophobic substances are encapsulated, the outside surface of the wall is generally smooth. As such, the preferred scintillator capsules of the present invention are generally smooth, but the present invention includes scintillators capsules that have a rough or irregular surface. The scintillation particles tend to be spherical, but as shown in FIG. 1d, the present invention encompasses irregular-shaped scintillator capsules 40 having a liquid scintillator core 42 and a wall 44. Furthermore, other materials can also be attached to, coated on or embedded within the walls 54 of the scintillator capsules 50 to enhance the sample analysis. For example, as shown in FIG. 2, receptors or antibodies 56 can be attached to the outer surface of the scintillator capsule 50 to perform proximity assays with radio-labelled ligand, antigen or second antibody reactants 58 in the sample.

The properties of the scintillator capsules depend in large part on the physical properties of the walls. For example, the scintillator capsule walls can be permeable, semipermeable or non-permeable. Preferably, the walls of the scintillator capsules are substantially impermeable to the sample being examined and the scintillator core. A variety of wall material is possible including: gelatine, copolymers (acrylics), ethylcellulose, poly condensates (e.g. urea, melamine), polyamide, polybutadiene, polyurethane, and methylmethacrylates. The wall thickness is typically 0.5–150 microns, but wall thicknesses can range from 0.005–500 microns, and the core typically makes up 25–95% by weight, but the percentage of the core can range from 1%–99%.

The liquid scintillator capsules can be prepared using a variety of encapsulation methods which, as stated above, can vary the characteristics, materials and medium for the scintillator capsules. The scintillator capsules can be prepared using mechanical/physical processes or chemical processes. Mechanical/physical encapsulation processes include spray-coating methods, such as pan coating, fluid-bed coating or Wurster air-suspension coating, and other physical processes, such as vacuum metallization, annular-jet encapsulation, liquid membranes, gas filled capsules or fasicontact process.

The chemical encapsulation processes include wall deposition from solution (complex coacervation, organic phase-separation coacervation, hydroxylpropyl celulose encapsulation, or urea-formaldehyde encapsulation), matrix solidification (spray drying, spray cooling, emulsified-melt solidification, solvent evaporation, starch-based processes, nanoparticle formation, and cellulose acetate particles) and interfacial reaction methods (interfacial polycondensation, isocyanate process, "parylene" free-radical condensation, alginate polyelectrolyte membranes, direct olefin polymerization, surfactant cross-linking, clay-hydroxy complex walls, and protein cross-linking). These techniques generally occur as an emulsion or dispersion.

Polycondensation encapsulation methods refer to the formation of a polymer or copolymer wall from a chemical condensation linking together molecules of a monomer or polymer and the releasing of water, alcohol, or other similar sample substance. For example, terephthaloyl choloride in toluene, (i.e. an organic solvent) is dispensed into an aqueous solution with polyvinyl alcohol whereafter ethylene diamine is added slowly. This results in polyamide encapsulated toluene. Consequently, if fluors are dissolved in the toluene, a microencapsulated scintillator is created.

The scintillator capsules can be made by any suitable encapsulation process resulting in scintillator capsules with the desired materials and characteristics. Preferably, the scintillator capsules of the present invention are made according to the encapsulation method described in U.S. Pat. Nos. 4,406,816 and 5,292,835 assigned to BASF Aktiengesellschaft and herein incorporated by reference. For example, U.S. Pat. No. 4,406,816 teaches the preparation of impermeable microcapsules whose walls consist of melamine-formaldehyde condensates. The microcapsules are achieved by condensing melamine formaldehyde precondensate and/or their $C_1$–$C_4$-alkyl ethers in water in which a substantially water-insoluble material forming the capsule core is dispersed.

The BASF method results in capsules, using Ultima Gold F or MicroScint O, with an average diameter of about 5 μm and average particle sizes from 1–10 μm. The particles or capsules make up about 48% by weight in an aqueous slurry. Depending on the circumstances, the scintillator capsules can be spray dried, resulting in a free flowing powder with about 93% solid containing material. Typically, these capsules or particles comprise 10–15% by weight of wall material and about 85% is the encapsulated gel or liquid. Alternatively, as described in U.S. Pat. No. 5,292,835 the scintillator capsules can be prepared by an encapsulation method by which the wall of the scintillator capsules are essentially polymethyl methacrylate.

According to the method described in U.S. Pat. Nos. 4,406,816 and 5,292,835, microencapsules have been prepared using commonly known solvents suitable for liquid scintillation counting, such as pseudocumene, phenyl xylyl ethane, and diisopropyl naphthalene. Other solvents suitable for microencapsulation include the solvent types mentioned in U.S. Pat. Nos. 4,406,816 and 5,292,835 such as xylene, dodecyl benzene, diphenyl ethane, phenylcyclohexane, benzyl toluene, DXE alkylbiphenyles etc.

To prepare the scintillator capsules, the solvents contain fluors in the usual concentration of approx. 5 gram/lt of primary scintillator and 0.7 grams/lt of a secondary scintillator. As previously mentioned, the primary scintillators can include PPO (diphenyloxazole), butyl PBD, PBD, α-NPO, terphenyl etc., and the secondary scintillators are POPOP, dimethyl POPOP, bis-MSB, diphenyl anthrancene, dimethylanthracene etc.

Referring to the encapsulation method described in example 1 of U.S. Pat. No. 4,406,816, scintillator microcapsules result from substituting the oil phase and colorants, specifically, the partial hydrated terphenyl, crystal violet lactone and n-benzoyl leuko methane blue, with diisopropyl naphthalene (DIN) containing diphenyl oxazole (PPO) and bis-MSB. The resulting scintillator microcapsules include a melamine formaldehyde resin containing a liquid scintillator core. Similarly, other scintillator capsules could use the above mentioned solvent DIN and the primary fluor PPO with dimethyl anthracene as the secondary scintillator.

In alternative scintillator capsules, the DIN solvent was substituted by pseudocumene and phenylxylyl ethane (PXE) both solvents containing 5 gr/lt of PPO and 0.7 gr/lt of dimethyl anthracene. This resulted in scintillator microcapsules of the PPO formaldehyde resin in which the cores contained the PPO and dimethyl anthracene with pseudocumene and PXE. These scintillator particles or microcapsules are obtained as aqueous slurries and are spray dried to obtain a near white, free flowing powder.

Furthermore, scintillator capsules can be obtained using the poly methyl methacrylate methodology described in U.S. Pat. No. 5,292,835 of BASF Aktiengesellschaft. As in the melamine formaldehyde process, the scintillator microcapsules have scintillator cores but with the surrounding walls based on poly methyl methacrylate polymers.

Alternatively, scintillator capsules can be derived from other encapsulation techniques used to encapsulate chemical substances depending on the desired characteristics or materials for the scintillator capsules. For example, the scintillator capsules can be made from encapsulation processes previously mentioned. Different encapsulation processes and the resulting characteristics and materials for the capsules are described in W. Sliwka, Ulmanns *Encyclopädie der technischen Chemie* Band 16, and the microencapsulation section of Kirk-Othmer; *Encyclopedia of Chemical Technology*, Volume 15, 3rd Edition (1981), herein incorporated by reference.

The scintillator capsules are used to detect the presence of certain substances in a sample. To perform scintillation counting, these substances are radio-labelled with a radioactive material, such as a β particle emitters. Weak β emitters, such as tritium, have low decay energy and can be quenched by aqueous solutions. The average tritium β releases all of its energy (5.8 KeV) to the surrounding water in less than 1 μm when passing through an aqueous solution. Consequently, the radioactive species have to be in close contact with the scintillating compounds, as in liquid scintillation compositions.

Accordingly, the prior art stresses as a requirement that the radioactive species be in very close contact with the scintillator. Intimate contact seems required if short range radiation is to affect the fluors. As such, the scintillator capsules having a wall surrounding the liquid or gel scintillator core could be expected to produce very low counting efficiencies for tritiated solutions.

The following examples illustrate the good results obtained by the use of microencapsulated liquid scintillators.

Example 1

Scintillator capsules were prepared with a melamine-formaldehyde resin using the aforementioned technique described in U.S. Pat. No. 4,406,816.

A liquid scintillator fills the cores of the microcapsules surrounded by the melamine-formaldehyde wall. The liquid scintillator consists of diisopropylnaphthalene containing 5 grams per liter of PPO and 0.7 grams per liter of bis-MSB.

The microcapsules were spray dried and obtained as a free flowing powder referred to as Micro DPB.

Micro DPB are added to glass vials (6 ml) in the amount of 100 mgm. Thereafter, an aqueous solution of tritiated valine was added to the vials, and the compositions were shaken with the aid of a vortexer. As indicated in the table, different aliquots of tritiated valine were added.

Every ten μl of aqueous solution contained 75736 dpm of tritiated valine. After mixing, the samples were counted in a liquid scintillation counter using manufacturers instructions for counting tritium. The wet counting results are given in Table 1.

Next, the vials were put in an air-ventilated oven for 1 hour at 50° C. to evaporate the residual water. After cooling to room temperature, the vials were counted again.

The dry counting results are also given in Table 1. The absolute efficiencies for both wet counting and dry counting are shown.

As can be seen from Table 1, the dried compositions showed excellent linearity.

TABLE 1

| Results Tritium Counting In Micro DPB | | | | |
|---|---|---|---|---|
| Added Volume of Label | Wet Counting | | Dry Counting | |
| μl | cpm | % eff. | cpm | % eff. |
| 10 | 18254 | 24.1 | 27751 | 35.6 |
| 20 | 30897 | 20.3 | 54547 | 36.0 |
| 30 | 41289 | 18.2 | 72998 | 31.8 |
| 40 | 44458 | 14.6 | 106306 | 35.1 |
| 50 | 40591 | 10.7 | 135810 | 35.8 |
| 60 | 47200 | 10.4 | 168100 | 36.9 |

Example II

A microencapsulated liquid scintillator is prepared as in Example I. Instead of the tritiated valine, 10 μl aliquots of an aqueous C-14 valine solution were added to the vials containing Micro DPB. Ten μl of the C-14 labelled valine solution contains 63383 dpm of C-14 labelled valine.

Using the same sample preparation methods described for Example I, excellent wet counting and dry counting results were obtained with the microencapsulated scintillators.

Table 2 shows the wet counting and dry counting results of the C-14 labelled valine with the microencapsulated scintillators.

TABLE 2

| Results Carbon-14 Counting With Micro DPB | | | | |
|---|---|---|---|---|
| Added Volume of Label | Wet Counting | | Dry Counting | |
| μl | cpm | % eff. | cpm | % eff. |
| 10 | 52561 | 83.1 | 56657 | 89.4 |
| 20 | 96474 | 76.1 | 109890 | 86.8 |
| 30 | 145718 | 76.7 | 167933 | 87.9 |
| 40 | 184949 | 73.0 | 222986 | 87.9 |
| 50 | 216769 | 68.3 | 273088 | 86.4 |
| 60 | 273285 | 71.9 | 339704 | 89.4 |

Example III:

A microencapsulated liquid scintillator is prepared of a melamine formaldehyde resin as described in Example 1.

The liquid scintillator filling the cores of the microcapsule consists of diisopropyl naphthalene containing 5 grams of PPO/liter and 0.7 grams of dimethyl anthracene/liter. The microcapsules were spray dried and finally obtained as a free flowing powder, referred to as Micro DPD.

An aqueous slurry of Micro DPD was prepared with 2.30 grams of Micro DPD; 4.3 grams of deionized water; 5.0 grams of a 0.8% solution of a binder in water; and 0.3 grams of a 1% surfactants solution.

The slurry was stirred vigorously for about 15 minutes to ensure homogeneous distribution of the particles in the medium.

The aqueous slurry was added to a polypropylene cup φ14 mm height approx. 1 cm in the amount of 200 μl. Several of these cups were prepared. The prepared cups were air-dried to remove water for 16 hours. A dry layer was formed at the bottom of the cups. Then a solution of labelled compounds was added in triplicate to the cups, whereafter the cups were air dried. The labelled compounds were 70299 dpm/sample of tritiated valine and 140396 dpm/sample of carbon-14 valine.

After drying, the caps were placed in a Pico-Plate 24 (Packard Instrument Company, Downers Grove, Ill.) in which the cups fit nicely. The samples were counted on a TopCount (Packard Instrument Company) according to instructions of the manufacturer. The results of the scintillation counting are shown in Table 3. As can be seen from Table 3, the absolute counting efficiencies for the scintillator capsules are quite good.

TABLE 3

Results Of Dry Counting With Micro DPD

| Obtained cpm | Radioactive Label | Abs. Counting Eff. |
|---|---|---|
| 21502 | tritiated valine | 30.6 |
| 118142 | carbon-14 valine | 84.1 |

Accordingly, the scintillator capsules of the present invention can be effectively utilized in a variety of scintillation counting applications with different materials. Furthermore, additional components or materials can be added to the scintillator core or cores to modify the characteristics of the scintillator capsules, or other materials, such as antibodies or receptors, can be attached to the capsule walls to perform a proximity or binding assay. Moreover, by altering the encapsulation process, the characteristics and materials of the scintillator capsules can also be modified.

The scintillator capsules of the present invention have been specifically described as encapsulated liquid scintillators, but the present invention encompasses gel scintillators. Additionally, the preferred embodiment has been described as using impermeable walls, but the present invention includes permeable, semi-permeable or selectively permeable walls. Furthermore, the scintillator capsules have been specifically described for analyzing sample containing β-emitters, but other radioactive species can be utilized, such as alpha and gamma particle emitters.

Thus, the scintillator capsules and method for performing scintillation counting using the scintillator capsules and many of its attendant advantages will be understood from the foregoing description and various modifications may be made in the form, materials and applications of the scintillator capsules without departing from the spirit and scope of the invention or sacrificing all of its material advantages, the form described above being merely a preferred embodiment thereof.

I claim:

1. A scintillator capsule for producing scintillations in response to radioactive substances in a sample, said scintillator capsule to be located with said sample and comprising:
   a liquid scintillator core having a fluorescent substance for converting radiation energy from said sample into light energy; and
   a wall surrounding said core, said wall having a diameter less than 3000 microns and being permeable to said light energy and to said radiation energy from said sample, said core being located inside said wall and said sample being located outside of said wall.

2. The scintillator capsule of claim 1 wherein said liquid scintillator core is lipophilic.

3. The scintillator capsule of claim 1 wherein said liquid scintillator core is sparingly soluble in water.

4. The scintillator capsule of claim 1 wherein said liquid scintillator core includes at least one base component.

5. The scintillator capsule of claim 4 wherein said one base component is a solvent for dissolving said fluorescent substance.

6. The scintillator capsule of claim 5 wherein said one base component includes an aromatic solvent.

7. The scintillator capsule of claim 1 wherein said wall includes a polymer.

8. The scintillator capsule of claim 7 wherein said wall is melamine formaldehyde.

9. The scintillator capsule of claim 7 wherein said wall is polymethyl methacrylate.

10. The scintillator capsule of claim 1 wherein said wall includes a plastic material.

11. The scintillator capsule of claim 1 wherein said fluorescent substance is an organic fluor.

12. The scintillator capsule of claim 1 wherein a receptor is attached to said wall.

13. A scintillator capsule for producing scintillations in response to radioactive substances in a sample, said scintillator capsule to be located with said sample and comprising:
   a liquid scintillator core being hydrophobic and having a fluorescent substance for converting radiation energy from said sample into light energy and at least one solvent for dissolving said fluorescent substance; and
   a plastic wall surrounding said core, said wall having a diameter less than 3000 microns and being permeable to said light energy and to said radiation energy from said sample, said core being located inside said wall and said sample being located outside of said wall.

14. The scintillator capsule of claim 13 wherein said solvent is an aromatic solvent.

15. A method for performing scintillation counting on a sample for detecting radioactive substances in said sample, comprising the steps of:
   providing scintillator capsules having liquid scintillator cores surrounded by plastic shells, said scintillator cores are lipophilic and having a fluorescent substance dissolved in at least one solvent;
   placing said scintillator capsules and said sample in direct contact; and
   counting scintillations emitted from said scintillator capsules by a scintillation counter.

16. The method of claim 15 wherein said scintillator capsules range in size from 0.1 microns to 3000 microns.

17. The method of claim 15 wherein said shells are polymers.

18. The method of claim 17 wherein said shells are melamine formaldehyde.

19. The method of claim 17 wherein said shells are polymethyl methacrylate.

20. The method of claim 15 wherein said fluorescent substance is an organic fluor.

21. The method of claim 15 further including the step of attaching receptors to said shells.

22. The method of claim 15 further including the step of disposing of said scintillator capsules and said sample as solid waste.

23. The method of claim 15 wherein said sample and said scintillator capsules are together in a liquid medium.

24. The method of claim 23 further including the steps of removing said liquid medium prior to counting and disposing of said sample and said scintillator capsules as solid waste.

25. The method of claim 23 further including the step of removing said liquid medium after scintillation counting and disposing of said sample and said scintillator capsules as solid waste.

26. The method of claim 15 wherein said solvent is an aromatic solvent.

27. A method for performing scintillation counting on a sample for detecting radioactive substances in said sample, comprising the steps of:

providing scintillator capsules having liquid scintillator cores surrounded by plastic shells, said scintillator cores are lipophilic, include a fluorescent substance for converting radiation energy into light energy dissolved in at least one aromatic solvent, and range in size from 0.1 microns to 3000 microns;

placing said scintillator capsules and said sample together; and counting scintillations emitted from said scintillator capsules by a scintillation counter.

28. The method of claim 27 further including the step of disposing of said scintillator capsules and said sample as solid waste.

29. The method of claim 27 wherein said sample and said scintillator capsules are together in a liquid medium.

30. The method of claim 29 further including the steps of removing said liquid medium from said sample and said scintillator capsules prior to counting and disposing of said sample and said scintillator capsules as solid waste.

31. The method of claim 29 further including the steps of removing said liquid medium from said sample and said scintillator capsules after counting and disposing of said sample and said scintillator capsules as solid waste.

32. A method for performing scintillation counting on a sample for detecting radioactive substances in said sample, comprising the steps of:

providing scintillator capsules having liquid scintillator cores surrounded by shells, said scintillator cores including a fluorescent substance and at least one base component;

placing said scintillator capsules and said sample in direct contact;

counting scintillations emitted from said scintillator capsules by a scintillation counter; and disposing said sample and said scintillator capsules as solid waste.

33. The method of claim 32 wherein said sample and said are together in a liquid medium.

34. The method of claim 33 further including the step of removing said liquid medium from said sample and said scintillator capsules prior to counting.

35. The method of claim 33 further including the step of removing said liquid medium from said sample and said scintillator capsules after counting.

36. A scintillation counting system for performing scintillation counting on a sample using scintillator capsules located with said sample to produce scintillations in response to radioactive substances in said sample, each of said scintillator capsules comprising:

a liquid scintillator core having a fluorescent substance for converting radiation energy from said sample into light energy; and a wall surrounding said core, said wall having a diameter less than 3000 microns and being permeable to said light energy and to said radiation energy from said sample, said core being located inside said wall and said sample being located outside of said wall.

37. A scintillation counting system for performing scintillation counting on a sample using scintillator capsules located in said sample to produce scintillations in response to radioactive substances in said sample, each of said scintillator capsules comprising:

a liquid scintillator core being hydrophobic and having a fluorescent substance for converting radiation energy from said sample into light energy and at least one solvent for dissolving said fluorescent substance; and a plastic wall surrounding said core, said wall having a diameter less than 3000 microns and being permeable to said light energy and to said radiation energy from said sample, said core being located inside said wall and said sample being located outside of said wall.

* * * * *